United States Patent [19]
Gray

[11] 3,940,885
[45] Mar. 2, 1976

[54] PROCESS AND EQUIPMENT FOR TREATING SEEDS AND PRODUCT THEREOF

[76] Inventor: Oscar Sam Gray, 2503 Lincoln Ave., Evansville, Ind. 47700

[22] Filed: Jan. 21, 1975

[21] Appl. No.: 542,775

[52] U.S. Cl. .......... 47/58; 219/10.55 M; 47/DIG. 9; 47/1.3
[51] Int. Cl.² ........................................ A01C 1/00
[58] Field of Search ............ 219/10.55 A, 10.55 M; 34/1; 47/58, 1.3, DIG. 9

[56] References Cited
UNITED STATES PATENTS

| | | | |
|---|---|---|---|
| 1,972,050 | 8/1934 | Davis | 47/1.3 UX |
| 2,308,204 | 1/1943 | Parry | 47/1.3 |
| 2,712,713 | 7/1955 | Jonas | 47/1.3 |
| 3,048,928 | 8/1962 | Copson et al. | 34/1 |
| 3,499,436 | 3/1970 | Balamuth | 47/1.3 X |
| 3,675,367 | 7/1972 | Amburn | 47/1.3 |
| 3,754,111 | 8/1973 | Jurgensen | 219/10.55 A |
| 3,822,505 | 7/1974 | Levengood | 47/1.3 |

Primary Examiner—Robert E. Bagwill
Attorney, Agent, or Firm—Carl V. Wisner, Jr.

[57] ABSTRACT

Seeds are subjected to microwave energy and a coolant gas, then subjected to a partial vacuum to stimulate growth and stabilize such stimulation. Seeds so treated have superior growth characteristics and are more resistant to disease and weather hazards. Apparatus for effecting this process is also disclosed.

6 Claims, 9 Drawing Figures

890 to 18000 MHZ for 1 to 25 Sec.
Temperature 40° to 70°F.

15 to 25 in. Hg. Absolute
3 to 10 Minutes

PROCESS AND EQUIPMENT FOR TREATING SEEDS AND PRODUCT THEREOF

CROSS-REFERENCE TO RELATED APPLICATIONS

Certain aspects of the subject matter relating to microwave treatments were disclosed in my application Ser. No. 137,712 filed Apr. 26, 1971, for Treatment of Plant Seeds, stems and Roots, which application has become abandoned. Related material is disclosed in my U.S. Pat. No. 3,494,723 for Method and Apparatus for Controlling Microorganisms and Enzymes, issued Feb. 10, 1970.

BACKGROUND OF THE INVENTION

The pressure on agronomists resulting from the worldwide demand for increased food supplies has led to the pursuit of numerous avenues of research in attempts to produce greater yields from the limited area of suitable agricultural land available for the production of agricultural or forest products usable for food or industry. Much effort has been devoted to treatment of seeds with various sorts of energy, among them radioactive, physical, sonic or ultrasonic, magnetic and laser, and numerous sorts of chemical treatments. Many of these processes are laboratory curiosities, experimental in nature, without concrete relation to the realities of commerce. Among the issue U.S. Patents relating to such subject mater are Nos. 43,292, 2,059,835, 2,101,584, 2,300,727, 2,344,151, 2,932,128 and 3,397,640, and the following foreign patents, British No. 743,350; Belgian No. 511,232, German No. 474,454; Canadian No. 608,485; French Nos. 874,656 and 922,132 and Nederlands Nos. 19,358 and 43,753. Low voltage treatment of seeds is discussed in an article entitled "Low Voltage Irradiation of Seeds" published in *Agriculture Engineering*, Vol. 38, No. 9, pp. 666–9, September, 1957.

While treatments such as these may improve yield, none of them have presented commercially satisfactory solutions to the problem. One of the reasons is that whatever stimulation these various sorts of treatment bring about, it is short-lived; i.e., if the time lapse between treatment and planting is short, improved yields may be established. However, the realities of processing and distributing seeds for agriculture or forest use do not fit in with such a brief time interval of stimulation so that efforts to improve yields along the lines described have proved a waste of time and money considered in the economic aspects of the problem.

Much effort has been expended by scientists in the development of "high yielding varieties" of various types of plants, of which wheat and maize are typical. The difficulty with these genetic innovations is that they have not been time-tested for disease resistance, an example of which was the epidemic of southern corn blight that destroyed a fifth of the United States crop in 1970. An object of this invention is to boost yields of standard varieties of crops or trees which have developed normal disease resistance over many hundreds, if not thousands, of crop generations. I have found, however, as a side effect in respect of tree seeds, at least, that subjection of seeds to my processes not only increases yield but develops disease-resistant characteristics which will be discussed later herein.

My invention is directed to a method of treatment, the apparatus therefor and the product thereof, which will not only stimulate seed growth but stabilize the stimulating factors, whatever they may be, over a reasonable period of time so that the seeds may be transported over whatever distance may be necessary, stored, if necessary, and still retain the efficacy of the stimulating factors so that, when ultimately planted, the seeds will reproduce in the desired quantity. The only attempts in the art known to me to be concerned with the extension in time of optimum seed growth characteristics are disclosed in an article in *Science* for Dec. 20, 1974, "Viability of Stored Seeds," pp. 1123–4, where experiments with the use of low voltage energy for this purpose are described.

In brief, I subject seeds to microwave energy in an atmosphere, the temperature of which is controlled in a manner hereinafter to be described, then sequentially and immediately after the treatment with microwave energy, I subject the treated seeds to a vacuum treatment, again in a manner hereinafter to be more particularly described. As the result of this sequence of treatments, seeds so treated have been stored for as much as one year while still retaining the same comparable added growth qualities that they would have had had they been planted immediately after treatment. I have found, however, that not only does the vacuum treatment secure the desired stabilizing effect, but that seeds which have been treated with microwave energy and then stabilized per vacua can produce a greater degree of growth and productivity than seeds which have been stimulated by an equivalen microwave treatment and then planted without stabilization. Thus there appears to be a synergistic interaction between the stimulation and the stabilization which produces seeds with superior growth and productive qualities.

As illustrative of the effect of this synergism, samples of bean seeds were subjected to four different sets of conditions as follows:

Sample 1: Microwave energy, cooling and vacuum;
Sample 2: Microwave energy only;
Sample 3: Microwave energy plus cooling;
Sample 4: Vacuum only.

The treated seeds, plus controls, were then planted and observations taken on germination in 65 hours and height of plant at 12½ days. Taking the growth of the control grown with Sample 1 as an index of 100, the growth of the plants subjected to the several types of treatments described, and the other controls, is set out in the following Table 1:

TABLE I

| Sample | Microwave Time | Complete Treatment 1 | Energy Only 2 | Energy plus Cooling 3 | Vacuum Only 4 |
|---|---|---|---|---|---|
| Control | | 100 | 93.4 | 100 | 97.7 |
| | 10 sec. | 126.8 | 93.4 | 100 | 93.3 |
| | 15 sec. | 146.7 | 106.8 | 120 | 90.0 |
| | 20 sec. | 106.8 | 33.4 | 53.4 | 93.3 |

Samples 1, 2 and 3 comprising three batches were subjected to 500 milliamps of 2450 megahertz for 10, 15 and 20 seconds, respectively; in Samples 1 and 3 the temperature was held to 70°F.; in Samples 1 and 4, the vaccum was 15 inches of Hg absolute for 5 minutes; Sample 4 represented three different batches plus the control and are arrayed opposite the lines of microwave time for convenience only. The treated seeds and controls were planted in flats 1 foot square and 5 inches deep.

I have indicated in this specification that the product treated in accordance with the procedures herein outlined may be stored for as much as a year or more. However, storage should be in facilities at a controlled temperature. I have found that if the temperature is controlled between 34°F. and 70°F., no decline in germination will occur.

The added yields resulting from seed treatments described in this specification will occur if no more than conventional agricultural practices are applied to treated seeds, in planting, care and harvesting. In other words, special inputs of fertilizer, water, insecticides and the like are unnecessary to produce the increased results in yield or growth following my described seed treatment; cf. *Science*, Dec. 20, 1974, pp. 1085–1088, 1093–1096.

Numerous types of seeds have been treated, planted and harvested, among them Bragg soybeans, Example 1; Davis soybeans, Example 2; Corn Hybrids, Examples 3 to 5; Atlas Cotton Seeds, Example 6; Georgia Early Runner Peanuts, Example 7; Slash Pine Seeds, Examples 8 and 9, and Loblolly Pine Seeds, Examples 10 and 11. Other types of seeds which have responded satisfactorily to the treatment generally described are canteloupe, oats, radishes, Oregon rye, watermelon, wheat, sunflower and tomato seeds.

It has been found in respect of Examples 7 to 11 that the prescribed treatment for seeds has a side effect on the statistical controls of an unexpected nature. In randomized planting controls are statistically located contiguous to treated seeds in accordance with standard statistical theory to secure what are considered objective results. In the planting of the Georgia Early Runner Peanuts of Example 7, controls were located not only randomly within the planting with treated seeds, but were likewise located in a border around the planting. Of the various treated seeds as shown in Example 7, Sample T-3 showed the largest yield, 5,109.6 in pounds per acre, of any of the various treatments. However, the inside controls produced 3,532.7 pounds per acre; the outside controls produced 1,847.52 pounds per acre. While it is impossible to specify the reasons for this effect, it is thought that during the period of growth, the intertwining of the roots of the treated seedlings with those of the controls transfers to the controls in some fashion or other a portion of the benefits derived from the treatment. Where the controls are remote from the treated seeds as in the outside controls, the difference is substantial, e.g., Sample T-3 is 46.0 percentum more productive than the inside controls; it is 177 percentum more productive than the border controls. Thus it is possible by intermixing treated with untreated seeds to increase substantially the productivity of the untreated seeds if they are planted in the same plot.

The same effect is observable in the statistical data on the plantings of slash and loblolly pine set out hereinafter in Examples 8 to 11, respectively. In each of these plantings, no attempt was made to establish border controls as was the case with the Georgia Early Runner Peanuts of Example 7 so that the controls, randomly intermingled in the plantings, must be compared with data for state common and state improved all of which are provided in the examples hereinafter set out.

It will be understood, of course, by persons experienced in this type of work, that each seed of a different class, genus or variety may require differing treatments. What is efficacious for soybeans, will not necessarily produce an equivalent in tree seeds. Equally, different treatments may be required for differing varieties of soybeans. However, within the parameters hereinafter set out explicity, sufficient information is provided so that an operator presented with a type of seed for which treatment data has not been established can determine a preferred treatment for the particular seed in question.

The economic determinant of the efficacy of such treatment is, of course, the increase in harvested bushels per acre for such plants as soybeans. However, with such plants as slash or loblolly pines, the measure is growth per year. Not only do soybeans treated by my methods produce substantially more bushels per acre, slash and loblolly pine seeds treated by my methods, when planted, result in seedlings which grow much more rapidly.

One of the effects I have discovered as the result of treatment in planting is that to the eye of an observer, a field of soybeans planted with seeds so treated is much greener. Analysis indicates that the chlorophyll contents of the leaves and stems of soybeans so treated is higher than normal. Again, in respect of soybeans, normal production of commercially available beans is two beans to a pod; three beans to a pod is common and four beans are occasionally observed. In fields of beans grown from commercial seed treated by my methods, by count, 12 percentum of the pods were four-bean pods. In making this statement, I am mindful of the circumstance that special bean varieties, e.g., those disclosed in Plant Variety Certificate No. 7400094, shows a higher percentage of beans, but by practicing my process, commercial beans which normally would produce very four-bean pods can be stimulated to produce a substantial percentage of four-bean pods.

Another effect of my method of treatment which is particularly significant in tree seedlings in an increase in the hardiness of the seedling. During the course of an experimental planting which was begun prior to the filing of this application, treated loblolly and slash pine seedlings and control seedlings experienced as a random event an unprecedently heavy sleet and ice storm. The 8,000 treated seedlings went through it without any damage while the control seedlings were badly damaged by the event. Other manifestations of the salutary effects of my treatment with tree seedlings are absence of fusiform cankers, tip moth infestation, damping off and chlorosis and no evidence of dormancy.

Referring now to the drawings.

DESCRIPTION OF COMMERCIAL DEVICES

Figure 1:
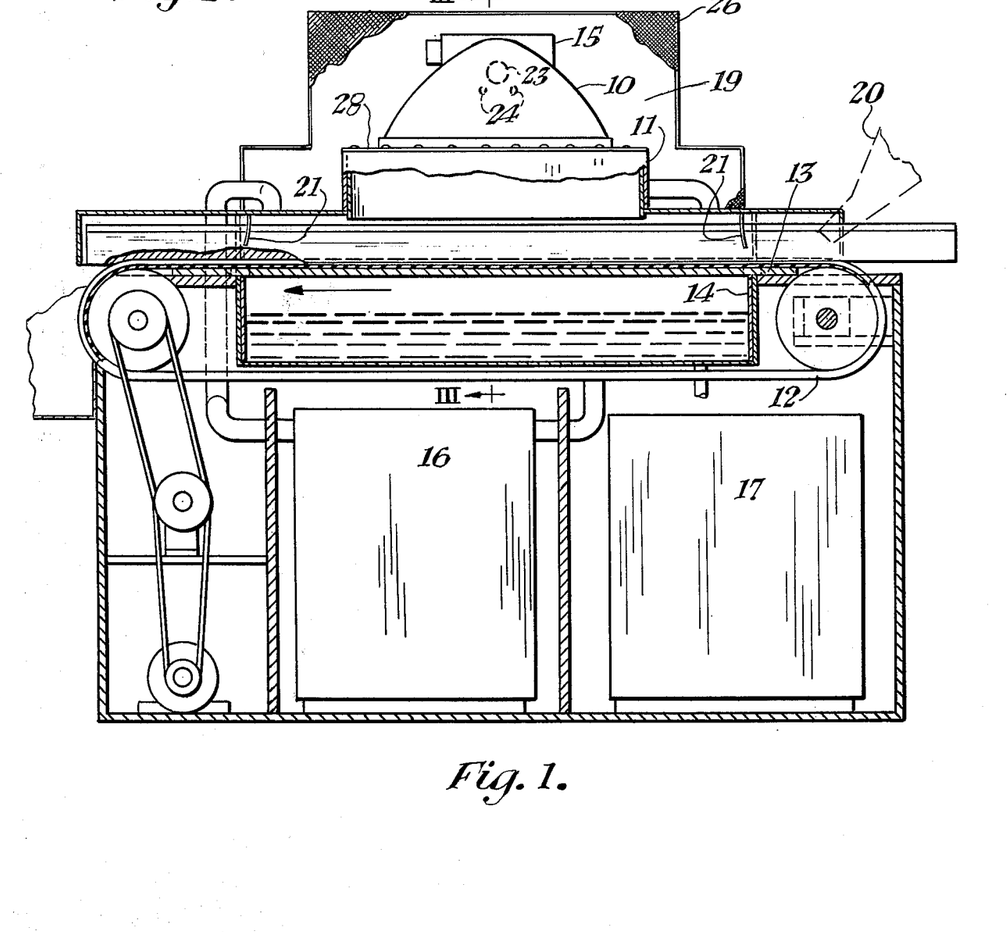
FIG. 1 is a side elevation, partly broken away, of a one magnetron unit for processing seeds such as soybeans.

In the commercial device shown in FIG. 1, it should be understood that it discloses an equipment of limited capacity for treating small quantities of seeds. The purpose of the device is to subject seeds for a very limited time interval, 1 to 30 seconds, to microwave energy, 2450 plus or minus 25 megahertz, under conditions of controlled temperature, while the seeds traverse the microwave field on an endless belt 12 before they are discharged by chute to be subjected to the vacuum step, later to be described, and shown schematically in FIG. 9. It is common knowledge that microwave energy is dangerous and must be confined. Hence, the entire unit is enclosed in a soldered screen as a shield 26, shown broken away in the drawings, with mesh of less than 3/16 inches.

The parameters of the equipment are determined by the approximate 4.8 inches length of the wave at 2450 meghertz. Thus each of the spacing of the horn 10 for the propagation of the energy from the seed bed, the depth of the seed bed on the endless belt 12, the depth of the water in the waterbed 14, is a function of this parameter.

Equally, the subjection of material to microwave energy causes a heat rise which would, if not dissipated, damage the seed. This is done by providing a source of refrigerated gas 16 circulated through the seeds to maintain the seeds being processed through the microwave energy at a temperature of from 40° to 70°F.

The cavity 19 in which the seeds are processed and the waterbed 14 are shown in FIG. 1. At the top of the cavity is a turret 11 designed to encompass a horn 10 of parabolic configuration in side elevation, having rectangular dimensions of 2 by 28 inches at the mouth. In the low capacity equipment shown in FIG. 1, but one horn is employed. To accommodate varying depths of seeds, the posture of the horn is adjustable upwardly and downwardly. This is done by shimming the horn in a manner hereafter to be described, when it is necessary to move it further from the seed bed.

The seeds are charged on to the endless belt 12 by the chute 20 at the right which traverses the mouth of the horn 10 in the direction of the arrow, FIG. 1 discharging the seeds at the end of the traverse by a chute, not shown, to containers for immediate processing by the vacuum process, later to be described. To insure that the belt and seeds being carried therealong are at all times true to the horizontal, a slide board or platform 13 is provided above the waterbed 14 and below the belt 12 so that the aspect of the traversing seeds will be a constant with the mouth of the horn. Means 17 for circulation of the water in the waterbed are provided, as shown in FIG. 1.

Referring now specifically to the cavity 19, it comprises a parallelepipedal structure of aluminum or stainless steel, the interior having polished, smooth, flat sidewall surfaces, weld-free. The cavity has an open bottom for insertion into the waterbed. At either end, it has proximal and distal slots to provide for the slide board and moving belt. On the interior of the cavity at each of said slots are streamers 21 of aluminum foil to preclude the egress of microwave energy from the cavity outwardly beyond the belt.

Figure 4:
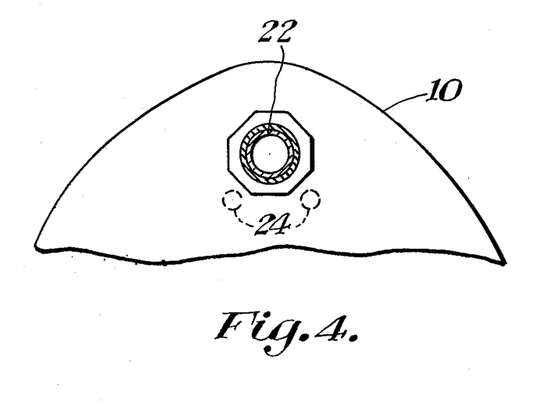
FIG. 4 is a view, partly broken away, of the horn of the device.

Pending through the turret into the cavity is a horn 10 of either aluminum or brass of parabolic construction, as shown. The horn is driven by a magnetron 15 inserted through an opening at the focus of the parabola. Engaging the magnetron is a quater-wave dipole 22 which extends into the horn to engage a cup 23 on the side of the horn opposite the opening for the magnetron. The dipole 22 is of aluminum or brass tubing with its tips tapered and slotted. Beyond the dipole 22 but contiguous thereto are a pair of tuning pins, 24, 24, of solid aluminum or brass rod, the function of which is to tune the horn to direct the flow of energy therefrom. The location of such pins should be approximately as shown but the optimum location of the pins is within the skill of the art.

Figure 2:
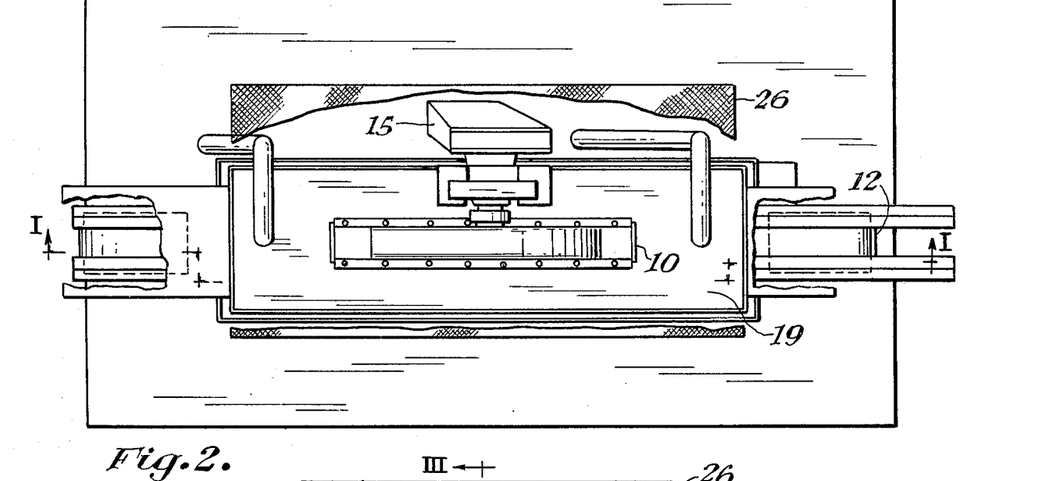
FIG. 2 is a plan view of the device shown in FIG. 1.
Figure 3:
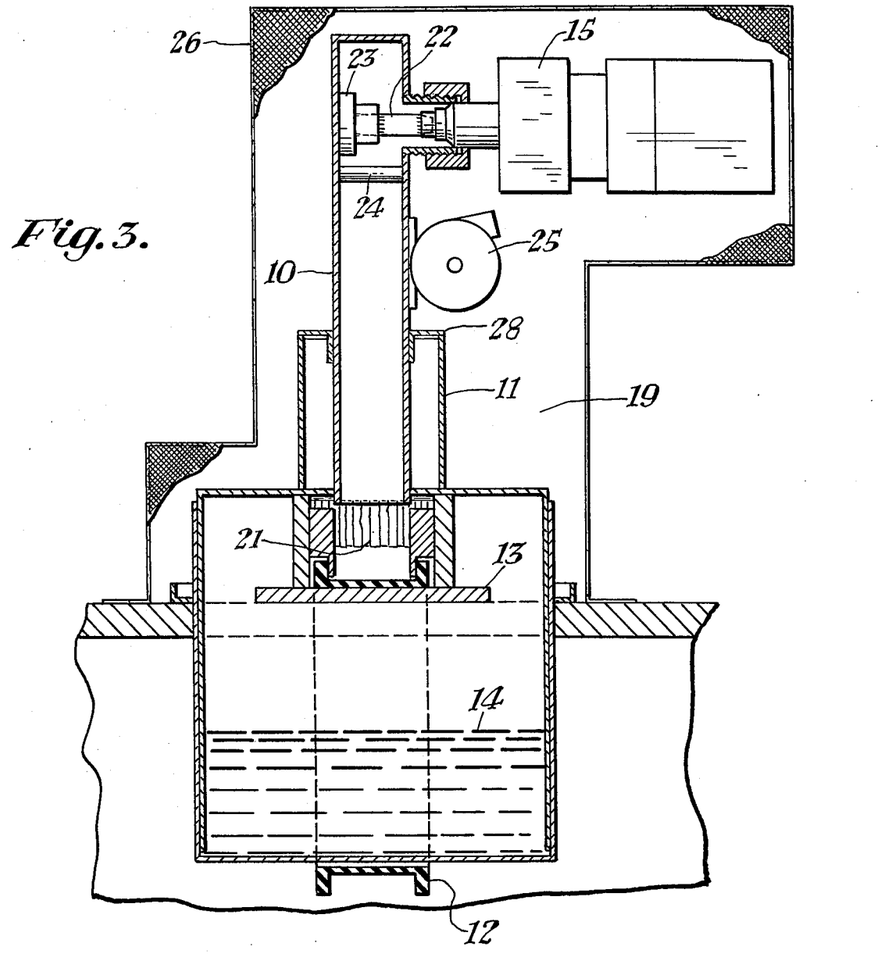
FIG. 3 is a sectional view along the lines 3—3 of FIG. 2.

As the magnetrons 15 generate heat, means are provided in the form of fans 25 for dissipating the heat. Alternatively, water cooled magnetrons may be used. In the device shown in FIGS. 1–3, only one horn and magnetron is disclosed. In equipments having heavy commercial capacity, shown in FIGS. 5–7, a series of magnetrons and horns is provided. In such circumstances, the horns are rotated at 90° to the position shown in FIG. 1 and spaced approximately 18 inches apart on centers to provide clearance for the magnetrons and fan-cooling means to reduce the heat rise in the magnetrons when they are energized The functions of the waterbed 14 are (a) to maintain a matched load; (b) to absorb any excess energy not taken up by the product being processed; and (c) to act as a seal to prevent leakage of microwave energy.

Figure 5:
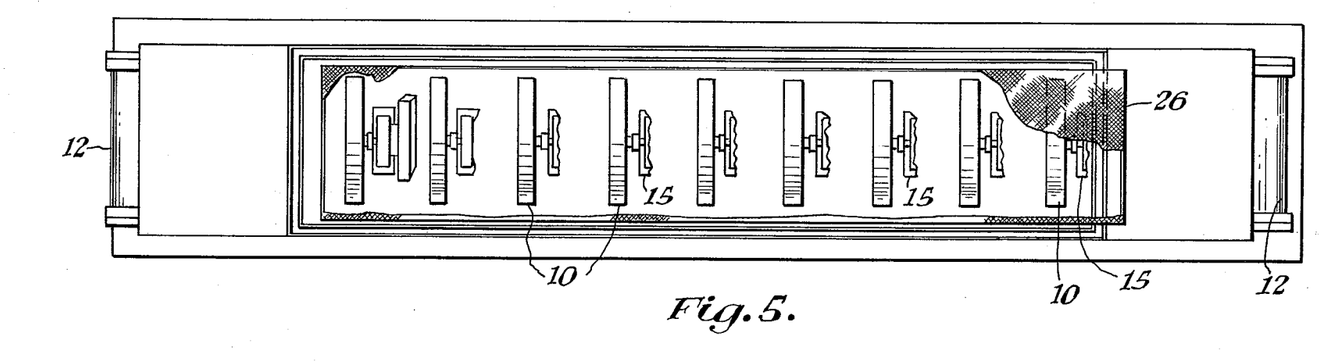
FIG. 5 is a plan view, partly broken away, showing a multiple horn equipment.
Figure 6:
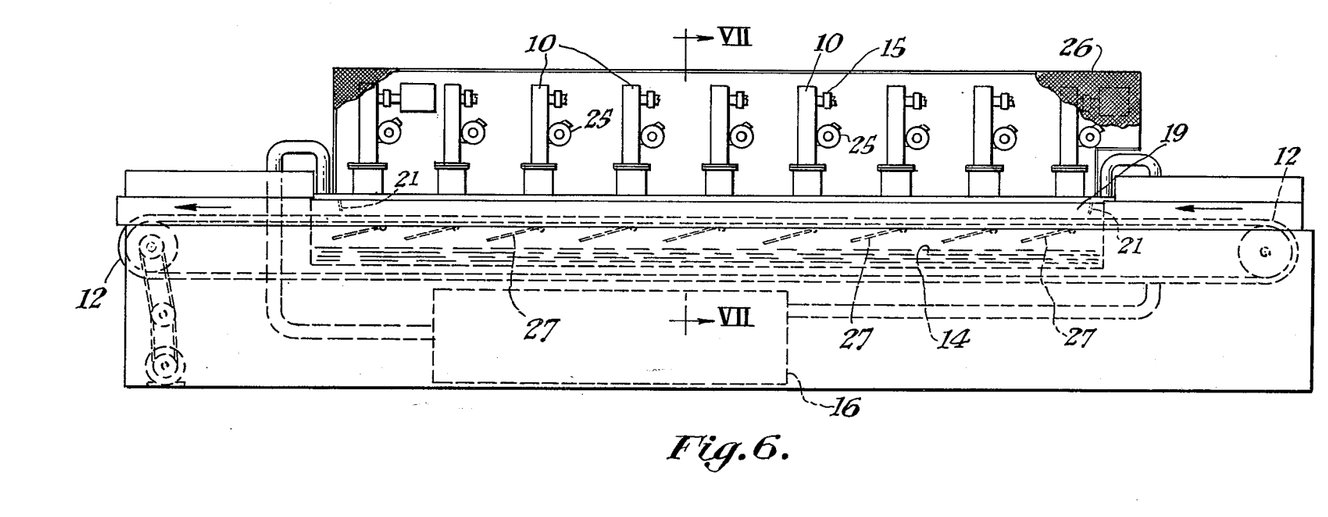
FIG. 6 is a sectional view along the lines 6—6 of FIG. 5 however showing an elevational view of the shield, partly broken away.
Figure 7:
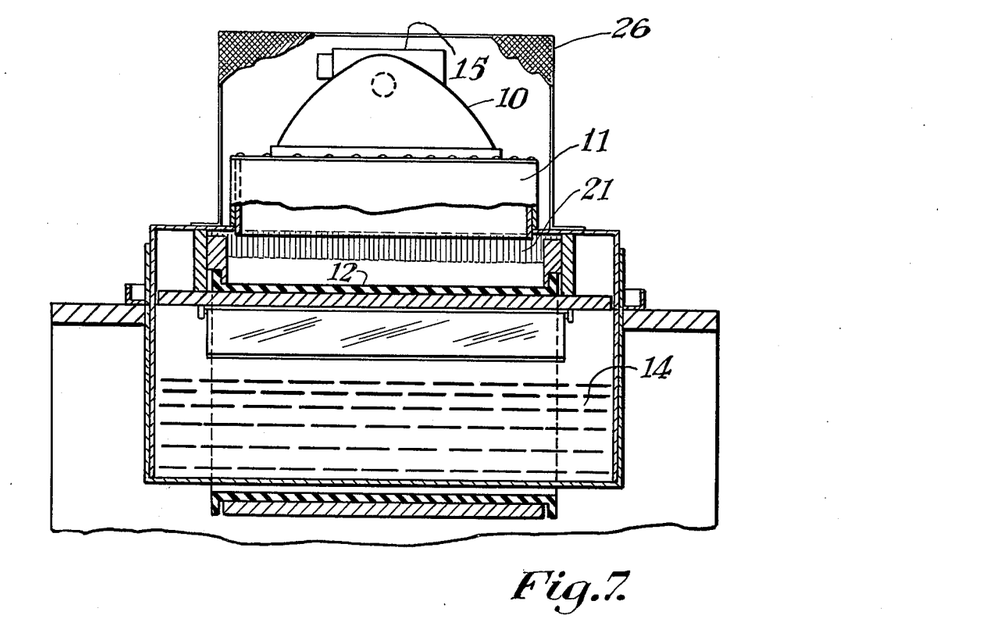
FIG. 7 is a sectional view along the lines 7—7 of FIG. 5.

In FIGS. 5–7, I show a multiple horn system designed to process up to 10,000 pounds of seeds per hour. As I have indicated, the horns are disposed at 90° to the long axis of the belt and are spaced approximately 18 inches apart to provide clearance for the magnetrons and cooling equipment. This leaves a gap of approximately 18 inches between each horn and to provide a continuing flow of energy through this space, I dispose a reflector 27 below each horn at an angle of from 14° to 17° to the horizontal to direct energy to the space between the horns, see FIGS. 6–7. Preferably the reflectors are of stainless steel or polished aluminum.

The endless belt 12 is preferably of neoprene or similar material having the physical characteristics that it will absorb a minimum of microwave energy and remain inert to oils, fats or waxes which might be experienced in processing oily seeds. The spacing between the mouth of the horn and the belt is adjustable, depending upon the depth of seeds on the belt. In machines for processing large quantities of seeds, the desired depth of seeds on the belt is a maximum of 3 inches. With this depth of seeds, the optimum performance is to space the mouth of the horn from the top of the seed bed so that the peak of the wave would register about 1½ inches below the top of the seed bed. Where a 1-inch seed bed is utilized, the spacing is changed so that the peak of the wave is at the top of the seed bed. Such adjustments are necessary since the machine must be adaptable to processing many types and varieties of seeds which are quite variant in their dimensions and require a different set up adjustment. This is done by shimming although other means are possible. On either side of the horn is a flange 28 which rests on top of the turret, 11. It can be raised by shims to any new position desired as the depth of the seeds on the belt may require it.

Amperage may be varied. However, I have found that using as little as 180 milliamps requires an increase of exposure time to the point where negligible volume can be processed on a commercial machine; at 740 milliamps, the heat rise becomes such that air has to be cooled to about 35°F. to 40°F. with attendant shortening of magnetron life. I have found that about 500 milliamps works best with air cooled to 70°F., thus maximizing the capacity of commercial processing equipment designed in accordance with my invention.

Figures 8, 9:
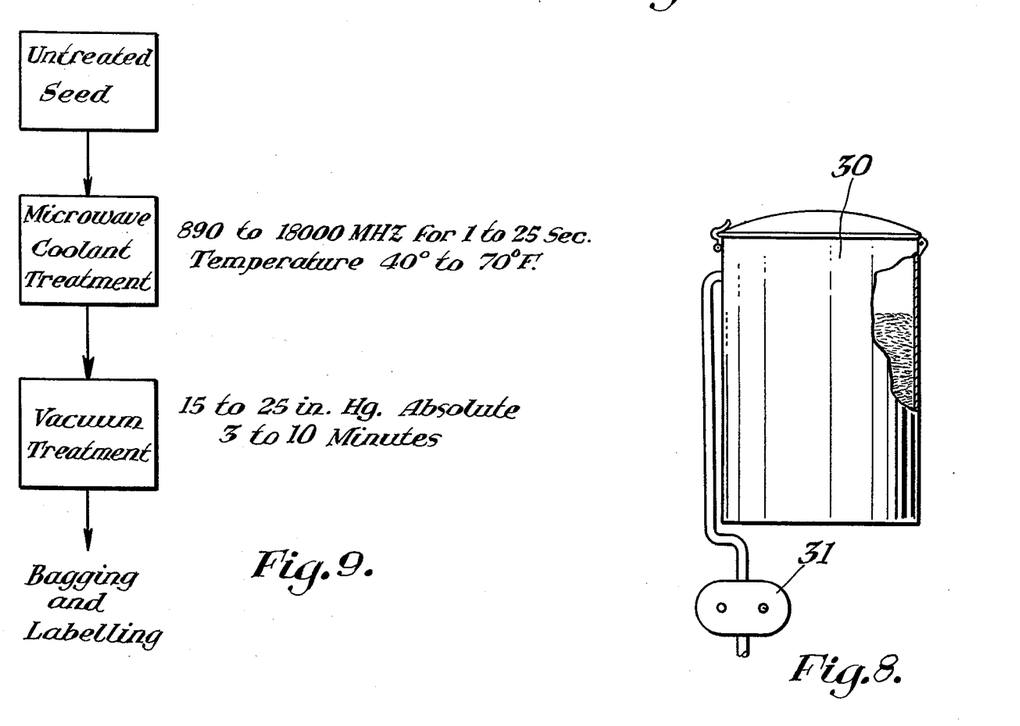
FIG. 8 is a view of the vacuum equipment, partly broken away. to show the seeds in place during the vacuum process.
FIG. 9 is a flow diagram for the treatment showing in a general way the limits in microwave energy and time for the microwave stage in this treatment and the degree of vacuum and time for the vacuum stage in the treatment.

Treatment of the seeds proceeds continuously with discharge through a chute into suitable containers which, as quickly as it can conveniently be done, are deposited in vacuum chambers 30 of a conventional type, shown in FIG. 8 with pumps 31, and subjected at room temperature to a vacuum of from 15 to 25 inches Hg. absolute pressure for a period of about 5 minutes. Following this treatment, the treated seeds are then ready for packaging and distribution to agriculturalists.

DESCRIPTION OF TEST PROCEDURES

In testing and control seeds for the examples hereinafter set out in this specification, I have followed the statistical procedures specified in *Experimental Design*, Cochrane & Cox, John Wiley & Son, New York (2d ed.), (1957), pp. 95 to 147. All seeds utilized both for treatment and control were commercially procured and were planted in statistical field plots after treatment. Planting occurred from 2 weeks to 14 months after the treatment was completed.

In summary of the several variables involved in the practice of my process, they are as follows and will be described hereinafter in detail:

1. Microwave frequency;
2. Microwave amperage;
3. Treatment time in seconds;
4. Control temperature;
5. Degree of absolute vacuum;
6. Vacuum time in minutes;
7. Depth of seed bed;
8. Spacing of top of seed bed from mouth of horn;
9. Reflector angle;
10. Liquid content of seed.

1. Microwave Frequency: As indicated above, I prefer a frequency of 2450 megahertz plus or minus 25 megahertz; the range above and below this frequency is controlled by the parameters of the machine to be designed, as previously described; the maximum and minimum frequency ranges are 890 to 940 megahertz with a wave length of about 13 inches, and 2400 to 2500 megahertz with a wave length of about 4 to 5 inches of the wave lengths presently available under Federal Communication Commission regulations.

In the United States, the available microwave bands dictated by the Federal Communication Commission govern the bands within which my process can be put to use. The available 890–940 band with a wave length of about 13 inches is impractical because of the design parameters involved. This makes the available band of frequencies of about 2400–2500 with a wave length of about 4–5 inches the most convenient. The available band from 17,850–18,000 with a wave length of about 0.7 inch is impractical for the same reason as the 890–940 band. It is not understood that such limitations are prevalent in areas outside of the United States. In consequence, useful microwave energy in the band from about 890 megahertz through 18,000 megahertz could be utilized although the design parameters based on 2450 megahertz are the optimum for the construction of equipment.

2. Microwave Amperage: My preferred amperage is 500 milliamps, with a range from 180 milliamps to 740 milliamps;

3. Treatment Time in Seconds: This varies with the type of seed with a range of from 1 second to 25 seconds;

4. Control Temperature: This variable depends upon the amperage; with the preferred amperage of 500 milliamps, the control temperature should be 70°F.;

5. Degree of Absolute Vacuum: The vacuum in absolute inches of mercury may vary from 15 inches absolute to 25 inches absolute; in most of my processing I have found that the higher range is suitable for effective stablization of the seed;

6. Vacuum Time in Minutes: I have found that 5 minutes is an effective time interval for subjection of the microwave process seed to the vacuum treatment;

7. Depth of Seed Bed: This will vary with the types of seed; with such seeds as soybeans, I prefer a 3-inch bed depth; with much smaller seeds, 1 inch is the preferred depth;

8. Spacing of Top of Seed Bed from Mouth of Horn: With a bed depth of 3 inches, the top of the seed bed should be spaced from the mouth of the horn so that the peak of the wave of approximately 4.8 inches is at 1½ inches below the top of the bed; with a depth of seed bed of 1 inch, the peak of the wave length should be at the top of the bed;

9. Reflector Angle: In multiple horn equipments, reflectors are desirable to concentrate the microwave energy which penetrates the seed bed back so that it reacts on the seeds in the space of approximately 18 inches between horns; this angle I have found properly variable from 14° to 17°, depending upon the depth of the seed bed; e.g., where the seed bed is 3 inches in depth, the reflector angle should be 17°; where one inch, 14°, or at whatever angle is necessary to reflect the energy back between the horns.

10. Liquid Content of Seed: For best results, liquid content of seeds should be 5 to 12 percentum; when liquid content is less than about 5 percentum, exposure time must be lengthened. This is true where the liquid content is water or oil. When the liquid content exceeds about 12 percentum, cooling temperature must be lowered and the exposure time shortened.

In Table II below, I set out data on the growth characteristics for 15 examples of various types of seeds which were treated in accordance with my process. Each of the samples of seeds were treated at 500 milliamps for varying time intervals reported in seconds, column (4), at the temperature set out in column (3), and were then subjected for 5 minutes to the vacuum set out in column (5). The seeds were then planted with controls and the growth noted at the end of 12½ days after planting. The percentage of increased growth of the treated seeds over the controls is shown in column (6) and the time interval of microwave treatment in which the peak of growth was noted is set out in column (7). These data are as follows:

TABLE II

| Item (1) | Sample (2) | Microwave Process Temperature (3) | Time Range (4) | Absolute Vacuum (5) | Growth Increase in % (6) | Optimum Time Range in sec. (7) |
|---|---|---|---|---|---|---|
| 1. | Corn A | n/a | 5/25 | 25 | 17/161 | 15 |
| 2. | Corn B | n/a | 5/25 | 25 | 11/65 | 15 |
| 3. | Corn C | n/a | 5/25 | 25 | 11/48 | 15 |
| 4. | Cotton | n/a | 5/20 | 25 | 4/37 | 5 |
| 5. | Peanuts | n/a | 5/17 | 25 | 8/41 | 10 |
| 6. | Soybeans | 70°F. | 10/20 | 15 | 107/146 | 15 |
| 7. | Canteloupe | 70°F. | 10/25 | 15 | 250/400 | 10 |
| 8. | Oats | 66–68°F. | 10/20 | 16 | 160/240 | 10/15 |
| 9. | Radishes | 70°F. | 15/25 | 15 | 400/800 | 15/20 |
| 10. | Oregon Rye | 70°F. | 10/20 | 15 | 300/800 | 15 |
| 11. | Watermelon | 70°F. | 10/25 | 15 | 112/175 | 10 |
| 12. | Winter Wheat (Arthur Variety) | 55°F. | 5/25 | 16 | 117/204 | 5 |
| 13. | Sunflower | 67°F. | 5/20 | 15 | 400/600 | 10 |
| 14. | Loblolly Pines | 68°F. | 10 | 15 | 400/500 | 10 |
| 15. | Slash Pines | 68°F. | 10 | 15 | 400/500 | 10 |

NOTE:
n/a denotes not available as data on microwave process temperature were not preserved.

In the following Exs. 1 to 11, I provide data on treatment parameters and dates, planting and harvesting dates, growth rapidity in respect of Exs. 3 to 5, and productivity in contrast with the controls.

EX. 1 (BRAGG SOYBEANS)

| Sample | Microwave Treatment Milliamp/Secs. | Yield in Bu. Acre | Percent. Increase |
|---|---|---|---|
| PP* | 350/10 | 66.5 | 332 |
| BSCV | 550/10 | 80.7 | 400 |
| BPGP* | 550/10 | 71.8 | 359 |
| BS | 550/12 | 80.6 | 400 |
| PSGP | 350/15 | 67.4 | 347 |
| BPCV* | 350/15 | 62.9 | 314 |
| Control | — | 20.0 | 100 |

Note 1:
The treated samples were treated November 3, 1971; all samples including controls were planted May 10, 1973, then were harvested in December, 1973.

Note 2:
Samples designated with an asterisk were perforated; other samples not perforated; perforation is effected by puncturing the skin of the seed with a needle, care being used to avoid injuring the germ; this procedure was followed for experimental purposes only; vacuum treatment was at 25 in. Hg. absolute for 5 minutes at room temperature.

EX. 2 (DAVIS SOYBEANS)

| Sample | Microwave Treatment Milliamp/Secs. | Yield in Bu. Acre | Percent. Increase |
|---|---|---|---|
| APGP* | 350/7 | 34.5 | 172 |
| AP* | 350/10 | 38.1 | 190 |
| DCG | 350/10 | 37.5 | 187 |
| AC | 550/5 | 40.1 | 200 |
| APCV* | 550/10 | 43.0 | 215 |
| ASGP | 550/10 | 47.8 | 239 |
| ASCV | 550/12 | 47.8 | 239 |
| Control | — | 20.0 | 100 |

Note 1:
The treated samples were treated November 3, 1971; all samples including controls were planted May 10, 1973, then were harvested in December, 1973.

Note 2:
Samples designated with an asterisk were perforated, other samples not perforated; see comments on perforation in note to Ex. 1; vacuum treatment was at 25 in. Hg. absolute for 5 minutes at room temperature.

EX. 3 (CORN HYBRID A)

| Sample | Microwave Treatment Milliamp/Secs. | Yield in Bu. Acre | Percent. Increase |
|---|---|---|---|
| A-4 | 500/5 | 64.3 | 17 |
| A-2 | 500/10 | 97.9 | 28 |
| A-6 | 500/15 | 143.5 | 161 |
| A-3 | 500/20 | 131.4 | 139 |
| A-5 | 500/25 | 107.8 | 96 |
| A-1 | 500/30 | 48.9 | — |
| Control | — | 55.0 | — |

Note:
The treated samples were treated June 7, 1973; all samples were planted April 22, 1974, near Athens, Georgia; the treated samples were harvested June 28, 1974, and the controls August 4, 1974; the rapid maturity of the treated samples should be noted.

EX. 4 (CORN HYBRID B)

| Sample | Microwave Treatment Milliamp/Secs. | Yield in Bu. Acre | Percent Increase |
|---|---|---|---|
| B-6 | 500/5 | 61.0 | 11 |
| B-2 | 500/10 | 81.9 | 49 |
| B-3 | 500/15 | 90.7 | 65 |
| B-4 | 500/20 | 77.5 | 41 |
| B-5 | 500/25 | 67.1 | 22 |
| B-1 | 500/30 | 49.5 | — |
| Control | — | 55.0 | — |

Note:
The treated samples were treated June 7, 1973; all samples were planted April 22, 1974, near Athens, Georgia; the treated samples were harvested June 28, 1974, and the controls August 4, 1974; the rapid maturity of the treated samples should be noted.

EX. 5 (CORN HYBRID C)

| Sample | Microwave Treatment Milliamp/Secs. | Yield in Bu. Acre | Percent. Increase |
|---|---|---|---|
| C-1 | 500/5 | 61.0 | 11 |
| C-3 | 500/10 | 69.8 | 27 |
| C-5 | 500/15 | 81.4 | 48 |
| C-6 | 500/20 | 73.7 | 34 |
| C-2 | 500/25 | 61.6 | 12 |
| C-4 | 500/30 | 61.0 | 11 |
| Control | — | 55.0 | — |

Note:
The treated samples were treated June 7, 1973; all samples were planted April 22, 1974, near Athens, Georgia; the treated samples were harvested June 28, 1974, and the controls August 4, 1974; the rapid maturity of the treated samples should be noted.

EX. 6 (ATLAS COTTON SEEDS)

| Sample | Microwave Treatment Milliamp/Secs. | Yield in Bu. Acre | Percent. Increase |
|---|---|---|---|
| A | 500/5 | 657 | 37 |
| B | 500/10 | 590 | 23 |
| C | 500/15 | 532 | 11 |
| D | 500/20 | 499 | 4 |
| Control | — | 480 | — |

Note:
The treated samples were treated January 20, 1974; the treated samples including the controls were planted May 21, 1974, and all samples were harvested December, 1974; planting was near Athens, Georgia.

EX. 7 (GEORGIA EARLY RUNNER PEANUTS)

| Sample | Microwave Treatment Milliamp/Secs. | Yield in lbs./acre | Percent. Increase Over Inside Control |
|---|---|---|---|
| T-2 | 500/5 | 3746.2 | 8.3 |
| T-4 | 500/7 | 3949.4 | 12.5 |
| T-3 | 500/10 | 5109.6 | 46.0 |
| T-5 | 500/17 | 4297.9 | 25.0 |
| T-6 | 500/25 | 3431.7 | 3.0 |
| Control (inside) | — | 3532.7 | — |
| Control (outside) | — | 1847.5 | — |

Note:
The treated samples were treated February 2, 1974; all samples were planted May 24, 1974, and harvested October 19, 1974; the planting was near Athens, Georgia.

EX. 8 (SLASH PINE, EARLY COUNTY, GEORGIA)

| Sample | Microwave Treatment Milliamp/Secs. | Height - Diameter in tenths of feet | |
|---|---|---|---|
| Control | — | 4.61 | 1.26 |
| B | 185/40 | 4.37 | 1.10 |
| C | 740/5 | 4.33 | 1.11 |
| A | 740/10 | 4.31 | 1.13 |
| State improved | — | 3.68 | 0.84 |
| State common | — | 3.67 | 0.88 |
| Samples A, B, C Vacuum 23 in. Hg. absolute | | | |

Note:
The treated samples were treated July, 1971; seeds were planted May, 1972, including the controls; the seedlings were planted January, 1973, and the measurements after twenty-three months were taken December, 1974.

EX. 9 (SLASH PINE, CLARK COUNTY, GEORGIA)

| Sample | Microwave Treatment Milliamp/Secs. | Height - Diameter in tenths of feet | |
|---|---|---|---|
| B | 185/40 | 4.27 | 1.21 |
| C | 740/5 | 4.10 | 1.20 |
| A | 740/10 | 4.02 | 1.19 |
| Control | — | 3.97 | 1.12 |
| State improved | — | 3.32 | 0.80 |
| State common | — | 3.24 | 0.69 |
| Samples A, B, C Vacuum 23 in.Hg. absolute | | | |

Note:
The treated samples were treated July, 1971; seeds were planted May, 1972, including the controls; the seedlings were planted January, 1973, and the measurements after twenty-three months were taken December, 1974.

EX. 10 (LOBLOLLY PINE, CLARK COUNTY, GEORGIA)

| Sample | Microwave Treatment Milliamp/Secs. | Height - Diameter in tenths of feet | |
|---|---|---|---|
| D | 740/10 | 5.12 | 1.23 |
| E | 185/40 | 4.61 | 1.08 |
| F | 740/5 | 4.60 | 1.09 |
| Control | — | 4.47 | 1.20 |
| State improved | — | 3.61 | 0.82 |
| State common | — | 3.43 | 0.80 |
| Samples D, E, F Vacuum 23 in.Hg. absolute | | | |

Note:
The treated samples were treated July, 1971; seeds were planted May, 1972, including the controls; the seedlings were planted January, 1973, and the measurements after twenty-three months were taken December, 1974.

EX. 11 (LOBLOLLY PINE, EARLY COUNTY, GEORGIA)

| Sample | Microwave Treatment Milliamp/Secs. | Height - Diameter in tenths of feet | |
|---|---|---|---|
| F | 740/5 | 5.45 | 1.32 |
| D | 740/10 | 5.28 | 1.18 |
| E | 185/40 | 5.23 | 1.28 |
| Control | — | 5.15 | 1.26 |
| State improved | — | 4.58 | 1.01 |
| State common | — | 3.98 | 0.85 |
| Samples F, D, E, Vacuum 23 in.Hg. absolute | | | |

Note:
The treated samples were treated July, 1971; seeds were planted May, 1972, including the controls; the seedlings were planted January, 1973, and the measurements after twenty-three months were taken December, 1974.

Seeds amenable to testing by processes come in many hundreds of varieties and a wide spectrum of sizes and weights, from 515,450 per ounce for *agrostis canina* L. (velvet bent grass) to 55 per ounce for *cicer arietinum* L. (chick pea), *stizolobium deeringianum* Bort. (velvet bean) or *phaseolus lunatus* L. (lima bean) or 7 per ounce for *prunus persica* Batsch. (*peach*), see *Rules for Testing Seeds*, Proceedings of the Association of Official Seed Analysts, Vol. 60, No. 2, 1970, pp. 4, 6, 11, 14 and 19. None of the seeds here referred to have been treated by my processing equipments. While I have given a number of examples of various types or varieties of seeds which have been treated by my process on the type of equipment described with a resulting significant improvement in growth rapidity, productivity, and other characteristics, it is impossible, considering the time intervals involved in conducting experiments to deal with even a minimum portion of the entire spectrum of seeds having agricultural, horticultural, or forestry uses. However, it is believed that my process will be efficacious in improving growth and productive qualities of any seeds of economic significance.

Having fully described my invention, I claim:

1. Apparatus for treating seeds comprising, in combination, a source of microwave energy, means to concentrate the energy propagated by such source, means to absorb random energy propagated by such source, means for passing such seeds through the field of such energy for a limited time interval, means to counteract the heat rise from the application of microwave energy by refrigerating and circulating within a chamber containing the apparatus gas at a controlled temperature, and means subjecting the seeds after the microwave treatment to a partial vacuum for a limited time interval.

2. Apparatus in accordance with claim 1, including a series of magnetron-driven horns as a source of microwave energy spaced from one another and disposed at an angle of 90° to the means for passing the seeds through the field of energy and reflecting means disposed below said passing means to reflect energy back into the spaces between said horns.

3. That process for stimulating growth and productive yield of seeds and maintaining such stimulus over a protracted time interval which comprises, first, subjecting the seeds to concentrated microwave energy in a range of from 890 to 18,000 megahertz, with the amperage ranging from 180–740 milliamps, for from 1 to 25 seconds in a temperature controlled atmosphere of from 40° to 70°F., then subjecting said seeds to a partial vacuum of from 15 to 25 inches of mercury, absolute, for from 3 to 10 minutes.

4. That process for improving the average productivity of seeds which comprises planting seeds treated in accordance with claim 3 and similar untreated seeds in contiguity with one another.

5. The process of claim 4, wherein said seeds are selected from the group consisting of seeds of corn, cotton, peanut, pine, cantaloupe, oat, radish, rye, watermelon, wheat, tomato, and sunflower.

6. A method of improving the average productivity of treated and similar untreated seeds which comprises first treating a quantity of seeds in accordance with claim 3, then intermingling the seeds so treated with similar untreated seeds in a random manner.

* * * * *

UNITED STATES PATENT OFFICE
CERTIFICATE OF CORRECTION

PATENT NO. : 3,940,885
DATED : March 2, 1976
INVENTOR(S) : OSCAR SAM GRAY

It is certified that error appears in the above-identified patent and that said Letters Patent are hereby corrected as shown below:

Column 4, line 36, insert --few-- between the words "very" and "four-bean";

In Claim 5, Column 14, substitute --Claim 3-- for "Claim 4".

*Signed and Sealed this*

*twenty-ninth* Day of *June 1976*

[SEAL]

Attest:

RUTH C. MASON
*Attesting Officer*

C. MARSHALL DANN
*Commissioner of Patents and Trademarks*